United States Patent Office 3,435,065
Patented Mar. 25, 1969

3,435,065
N,N,N',N' - (ETHYLENEDIAMINE) - TETRAKIS
[ETHYLENE - 3 - (3',5' - DI-TERT-BUTYL-
4' - HYDROXYPHENYL)PROPIONATE] AND
COMPOSITIONS STABILIZED THEREWITH
Martin Dexter, Briarcliff Manor, John Denon Spivack, Spring Valley, and David Herbert Steinberg, Bronx, N.Y., assignors to Geigy Chemical Corporation, Greenburgh, N.Y., a corporation of Delaware
No Drawing. Filed Oct. 22, 1965, Ser. No. 502,529
Int. Cl. C07c 93/26
U.S. Cl. 260—473                                    1 Claim

ABSTRACT OF THE DISCLOSURE

Compounds of the formula:

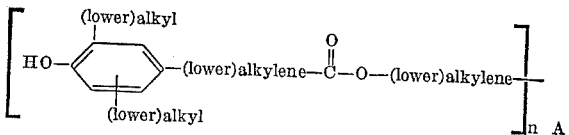

wherein A is

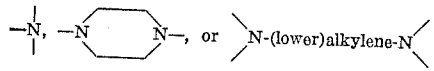

and in which $n$ has a value from 2 to 4, are useful for stabilizing organic material such as polyolefins. A preferred compound is N,N,N',N'-(ethylenediamine)-tetrakis[ethylene - 3 - (3',5' - di - tert-butyl-4'-hydroxyphenyl) propionate].

---

This invention relates to the stabilization of organic material normally subject to degradation due to such causes as oxidation in air, thermal degradation, or degradation due to radiant energy such as visible and/or ultraviolent light. Typical of such organic material normally subject to deterioration are polyolefin plastics and in particular polypropylene.

This invention also relates to the stabilized organic compositions and to methods of preparing them. In particular, this invention concerns the stabilization of such material with a stabilizer of the formula:

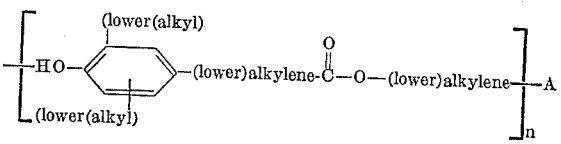

wherein A is

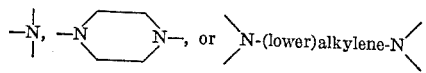

and in which $n$ has a value from 2 to 4.

In the above formula the term "(lower) alkyl" is meant to embrace straight or branched chain alkyl groups of from 1 to 9 carbon atoms and includes e.g. methyl, ethyl, propyl, isopropyl, tertiary butyl, pentyl, hexyl, heptyl, octyl, nonyl, etc. Preferred groups are a tertiary alkyl and in particular tertiary butyl. By the term "(lower) alkylene" in the above formula is meant a group of 1 to 18 carbon atoms which may be straight or branched chain. For example, methylene, ethylene, propylene, butylene, pentylene, hexylene, etc.

Accordingly, it is a prime object of the invention to provide stable organic material, e.g., stable polymeric material, and in particular polypropylene. In this specification it is understood that polymeric material means polyolefins such as polyethylene, polypropylene, etc. Preferably the polyolefins are of high molecular weight, e.g., above 1000 into the hundreds of thousands range. The polyethylenes and polypropylenes may be of high density, medium density or low density class.

Polymeric materials such as the foregoing find use as thermoplastic molding or coating agents. Moreover, because of their high dielectric strengths and their resistance to water, they are particularly useful as insulators or dielectrics in condensers and other such equipment. It is known that these polyolefins, e.g. polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement, gelation, etc.

Not only homopolymeric material, but also copolymers and physical mixtures thereof are stabilized according to the present invention.

Rubber, both natural and synthetic may be stabilized by the stabilizers of this invention. For example, high impact polystyrene containing copolymers of butadiene and styrene are stabilized according to the invention, as are copolymers of acrylonitrile, butadiene, and styrene.

The invention is also particularly useful in stabilizing lubricating oils of various types including aliphatic esters such as, e.g., dihexyl azelate, di-(2-ethylhexyl)azelate, di - (3,5,5 - trimethylhexyl)glutarate, di-(3,5,5-trimethylpentyl)glutarate, di-(2-ethylhexyl)pimelate, di-(2-ethylhexyl)adipate, diisoamyl adipate, triamyl tricarballylate, pentaerythritol tetracaproate, dipropylene glycol dipelargonate, 1,5-pentanediol-do-(2-ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures are all within the scope of the present invention.

Within the scope of the invention also are saturated and unsaturated hydrocarbons which tend to deteriorate on storage such as, e.g., gasolines, both natural and synthetic, in particular, saturated and unsaturated gasolines, etc.; jet fuel; diesel oil; mineral oil; fuel oil; drying oil; waxes; resins; etc. Such hydrocarbons are protected against gum formation, discoloration and other deterioration with the stabilizers of the present invention.

Also embraced within this invention are polyamides, polyurethanes, and polyesters.

It is understood that the stabilizers of the invention are not necessarily of equivalent potency. The specific stabilizer most useful to a given unstable material will depend upon several factors for its advantages. Availability and cost of raw materials for the manufacture of the stabilizer and effective inhibitory action of the stabilizer including duration and degree of activity are among the factors which control the choice of a specific stabilizer for a specific substrate which is normally subject to deterioration. Toxicity, color, stability to light and/or heat and solubility are also important factors.

In general, stabilizers of the invention are employed in a concentration of from about 0.001% to about 5% by weight, preferably from about 0.01% to about 1% by weight. The specific concentration used varies with the substrate and the stabilizer, but the following ranges are preferred.

Concentrations of about 0.001% to about 1% by weight for the stabilizer in polyethylene are useful. In polypropylene from about 0.05% to about 1% by weight of stabilizer is especially useful. In mineral oils, concentrations from about 0.005% to about 1% by weight of stabilizer are used. Gasolines are stabilized with from about 0.01% to about 0.1% by weight of stabilizer, preferably about 0.05% by weight. Fatty material of animal origin such as lard is stabilized with from about 0.001% to about 0.1% by weight of stabilizer.

Hydrocarbon material such as cycloolefins, e.g. cyclohexene, is advantageously stabilized with from about 0.001% to about 1% by weight of the stabilizers of the present invention. Similar concentrations of stabilizer are used to stabilize aldehydes such as, e.g., about 0.01% by weight in heptaldehyde. High temperature lubricants which are essentially diesters, e.g. diisoamyladipate, are stabilized with from about 0.5% to about 5%, preferably about 2%, by weight of a stabilizer according to the invention.

The compounds of this invention may also be used to stabilize organic material in combination with other additive agents such as, e.g., antioxidants, pourpoint depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet stabilizers, dyes, pigments, metal chelating agents, etc.

A particularly useful stabilizer system for polymeric material comprises a stabilizer of the Formula I and dilauryl-beta-thio-di-propionate (hereinafter referred to as DLTDP). Generally from about 0.005 to about 10% (based on the stabilized composition) by weight of DLTDP and other stabilizers, e.g. of the Formula I, are employed. Polypropylene is advantageously stabilized with about 0.5% by weight of DLTDP and 0.5% by weight of a stabilizer of the Formula I.

In place of DLTDP, other similar diesters are usefully employed with the stabilizers of the Formula I for stabilization of organic material, e.g., polypropylene. Such diesters as the following are useful:

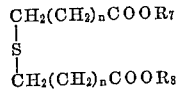

wherein $n$ is a small number, e.g. 1 or 2; and $R_7$ and $R_8$ are each independently an alkyl group, e.g. having 8 to 24 carbon atoms.

The compounds of this invention generally may be prepared by reacting a lower alkyl (such as methyl, and the like, which yield low boiling alkanols) di(lower)alkyl substituted 4-hydroxyphenyl alkanoate, with N,N,N',N'-(alkylenediamine) tetraalkanol; N,N'-bis(β-hydroxyalkyl)piperazine, or a trialkanolamine in the presence of a suitable catalyst, as an alkali alkylate.

The following examples describing certain representative embodiments of this invention will serve to further illustrate the nature of the invention. It is to be understood that the examples are merely illustrative and intended to enable those skilled in the art to practice the invention in all of the embodiments flowing therefrom and do not in anyway limit the scope of the invention defined in the claims.

EXAMPLE 1

Nitrilo-tris[ethylene 3-(3',5'-di-tert. butyl-4'-hydroxyphenyl)propionate]

A mixture consisting of 2.23 parts triethanolamine, 15.8 parts methyl 3-(3',5'-di-tert. butyl-4'-hydroxyphenyl)propionate and 0.27 parts sodium methylate is stirred and heated for four hours at 155±5° C. at atmospheric pressure. After cooling to room temperature an additional quantity of 0.27 part of sodium methylate is added and the reaction mixture stirred and heated 1.5 hours at 155±5° C. at atmospheric pressure, then three hours at 190° C. under a vacuum of 0.1–1.0 mm.

After cooling to room temperature, the reaction product is taken up in ether and the catalyst neutralized with glacial acetic acid. The ether solution is washed with a saturated sodium chloride solution and dried over sodium sulfate. The drying agent is removed and the solvent evaporated under diminished pressure. 8.78 parts (62.5% crude yield) of residue remains. Three crystallizations from 95% ethanol gives the desired product having a constant M.P. 106–8° C., which on thorough drying at 80°/0.1 mm. is raised to 110–111° C.

EXAMPLE 2

Nitrilo-tris[ethylene 3-(3',5'-di-isopropyl-4'-hydroxyphenyl)butanoate]

In a similar manner if in a procedure analogous to that of Example 1, methyl 3 - (3',5' - isopropyl - 4' - hydroxyphenyl)butanoate is reacted with triethanolamine there is obtained nitrilo-tris[ethylene 3-(3',5'-di-isopropyl-4'-hydroxyphenyl)butanoate].

EXAMPLE 3

Nitrilo-tris[ethylene(2',5'-di-tert.-butyl-4'-hydroxyphenyl)acetate]

If in a procedure analogous to that of Example I, methyl-(2',5'-di-tert.-butyl - 4' - hydroxyphenyl)acetate is employed the resultant product obtained is nitrilo-tris[ethylene(2',5'-di-tert.-butyl-4'-hydroxyphenyl)acetate].

EXAMPLE 4

N,N'-bis[ethylene 3-(3',5'-di-tert. butyl-4'-hydroxyphenyl)propionate]piperazine A reaction flask is flushed with nitrogen and charged with 3.48 parts of N,N'-bis(β-hydroxyethyl)piperazine, 14.1 parts of methyl 3-(3',5'-di-tert. butyl-4'-hydroxyphenyl)propionate and 0.27 part of sodium methylate. The reactants and catalyst are then heated at 155±5° C. for five hours at atmospheric pressure with continuous stirring. Thereafter a vacuum of 0.5–1.0 mm. is applied and heating and stirring at the same temperature continued for an additional five hours.

After cooling to room temperature, the reaction mixture is taken up in a mixture of 200 parts by volume of ether and 100 parts by volume of benzene. The catalyst is neutralized by adding a small quantity of glacial acetic acid. The organic solution is washed with 200 parts by volume of saturated sodium chloride solution, then dried over sodium sulfate. After separation of the drying agent by filtration and removal of the solvent under vacuum 12.7 parts (91.5% crude yield) of residue remains. Recrystallization of the residue twice from aqueous ethanol followed by two crystallizations from a mixture of cyclohexane-hexane gives the desired product of constant M.P. 135–6° C.

EXAMPLE 5

N,N,N',N'(ethylenediamine)-tetrakis[ethylene-3-(3,5-di-t-butyl-4-hydroxyphenyl)propionate]

23.6 parts (0.10 mole) of N,N,N',N'(ethylenediamine) tetraethanol is diluted with 110 parts by volume of dry dimethylsulfoxide and placed in a 3-necked flask equipped with stirrer, nitrogen inlet tube, Dry-Ice condenser, and a Dean-Stark moisture trap which is cooled with Dry-Ice. The system is then purged with nitrogen, 0.355 part (0.04 mole) of lithium hydride is added, and the resulting mixture is heated at 95° C. for 1 hour. When most of the lithium hydride is dissolved, the yellow solution is cooled to 40° C. and 128 parts (0.44 mole) of methyl-3 - (3',5' - di-tert.-butyl-4'-hydroxyphenyl)propionate is added. The reaction mixture is then heated at 90°–120° C. and 60 mm. Hg pressure for 6½ hours while 16.2 parts by volume of methanol (92% of theory) is collected in the Dean-Stark trap. The solvent is removed at 70°–90° C. and 4–1 mm. Hg pressure within 3 hours. The crude reaction product is then dissolved in 150 parts by volume of benzene, filtered through a layer of filtercel, and the solvent is evaporated under vacuum, yielding 140 parts of a light-yellow residue. The unreacted methyl-3(3′,5′-di-tert.-butyl-4′-hydroxyphenyl)propionate is removed by topping the residue in an "ASCO" molecular still at 160° C. and 1–5 microns pressure yielding 107.8 parts of residue and 7.1 parts of unreacted methyl-3-(3′,5′-di-tert.-butyl-4′-hydroxyphenyl)propionate. The residue from the topping is dissolved in 300 parts by volume of hot isopropanol and treated with activated carbon. The yellow solution is cooled, and yields 86 parts of N,N,N′,N′(ethylenediamine) - tetrakis[ethylene - 3-(3′,5′-di-tert.-butyl-4′-hydroxyphenyl)propionate] as a yellow crystalline material melting at 118°–122° C. Two successive recrystallizations from isopropanol yield the above compound melting at 120°–123° C.

EXAMPLE 6
Stabilization of polypropylene

Unstabilized polypropylene powder (Hercules PROFAX 6501) is thoroughly blended with 0.5% by weight of nitrilo - tris[ethylene 3 - (3′,5′-di-tert.-butyl-4′-hydroxyphenyl)propionate], made according to Example 1 hereinabove. The blended material is then milled on a two roller mill at 182° C. for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 mil thickness is then tested for resistance to accelerated aging in a forced draft oven at 149° C. The resultant composition of 0.5% by weight of nitrilo-tris[ethylene 3 - (3′,5′-di-tert. - butyl-4′-hydroxyphenyl)propionate] and polypropylene is stabilized against oxidative deterioration for 1260 hours. Unstabilized polypropylene deteriorated after only 3 hours.

In like manner as in this example, stabilized compositions of polypropylene are prepared having 0.5% by weight of a compound prepared according to each of the foregoing examples (1–5 inclusive).

Merely by way of further illustration compositions of polypropylene and the compounds of examples 4 and 5 were stabilized against oxidative deterioration for 975 and 837 hours respectively.

In a similar manner as in this example, stable compositions of polypropylene are prepared with 0.1% by weight of one compound according to each of the preceding examples (1–5 inclusive) together with 0.5% by weight of di-lauryl-β-thio-dipropionate. In some cases the improvement is so remarkable that a synergistic effect is observed in the oven-aging test.

For instance, the combinations of DLTDP and the compounds of Examples 1, 4, and 5 in the foregoing proportions stabilized polypropylene for 915, 585, and 1060 hours respectively whereas with 0.5% of DLTDP polypropylene was stabilized for only 300 hours.

EXAMPLE 7
Stabilization of mineral oil

A water-white, refined (U.S.P. grade) mineral oil (Esso PRIMOL D) may be stabilized under the following test conditions, A sample of mineral oil (10 parts) is placed in a Sligh type oxidation flask filled with oxygen at room temperature (25° C.) and atmospheric pressure. Thereafter, the flask is sealed to form a system having a mercury manometer which measures the pressure changes as oxygen is absorbed by the sample in the flask. The sample is then heated at 150° C. until the manometer registers a decrease of 300 mm. Hg pressure within the flask with reference to the maximum pressure obtained at 150° C. The stabilized mineral oil contains 0.1% by weight of a compound prepared in accordance with any of Examples 1 through 5.

EXAMPLE 8
Stabilization of a resin containing elastomer

High impact polystyrene resin containing elastomer (i.e. butadiene-styrene) may be stabilized against loss of elongation properties by incorporation of 0.5% by weight of a compound as prepared by any of Examples 1 through 5. Under the test conditions described, the stabilized resin retains its original elongation properties very well, whereas the unstabilized resin retains only 15% of its elongation properties. The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° C. and a pressure of 2000 pounds per square inch into a sheet of uniform thickness (25 mil). The sheets are then cut into strips, approximately 4 x 0.5 inch. A portion of these strips is then measured for length of elongation in the Instron Tensile Tester (Instron Engineering Corporation. Quincy, Mass.). The remaining portion of the strips is aged in a forced draft oven for 6 weeks at 75° C. and thereafter tested for elongation.

While the invention has been illustrated by a detailed description of certain specific embodiments, it is understood that various modifications and substitutions can be made in any of them within the scope of the appended claims which are also intended to include equivalents of such embodiments.

What is claimed is:
1. N,N,N′,N′(ethylenediamine) - tetrakis[ethylene - 3-(3′,5′-di-tert.-butyl-4′-hydroxyphenyl)propionate].

References Cited
UNITED STATES PATENTS

| | | | |
|---|---|---|---|
| 3,247,240 | 4/1966 | Meier et al. | 260—473 |
| 3,330,859 | 7/1967 | Dexter et al. | 260—473 |
| 2,368,208 | 1/1945 | Epstein et al. | 260—477 X |
| 3,025,297 | 3/1962 | Robinson | 260—477 X |
| 3,180,867 | 4/1965 | Shapiro | 260—268 |
| 3,186,993 | 6/1965 | Knapp | 260—268 |
| 3,218,322 | 11/1965 | Orloff | 260—268 |
| 3,267,103 | 8/1966 | Karupp et al. | 260—268 |

FOREIGN PATENTS 990,304 8/1965 Great Britain.

ALEX MAZEL, *Primary Examiner.*

D. G. DAUS, *Assistant Examiner.*

U.S. Cl. X.R.

260—45.8, 45.85, 268, 465.4